(12) United States Patent
Matsuo

(10) Patent No.: US 10,351,187 B2
(45) Date of Patent: Jul. 16, 2019

(54) ELASTIC CRAWLER

(71) Applicant: BRIDGESTONE CORPORATION, Chuo-ku, Tokyo (JP)

(72) Inventor: Shuichi Matsuo, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/577,347

(22) PCT Filed: Jun. 3, 2016

(86) PCT No.: PCT/JP2016/066691
§ 371 (c)(1),
(2) Date: Nov. 28, 2017

(87) PCT Pub. No.: WO2016/195103
PCT Pub. Date: Dec. 8, 2016

(65) Prior Publication Data
US 2018/0154958 A1    Jun. 7, 2018

(30) Foreign Application Priority Data
Jun. 5, 2015    (JP) .................................. 2015-114704

(51) Int. Cl.
*B62D 55/24*    (2006.01)
*B62D 55/253*    (2006.01)

(52) U.S. Cl.
CPC ......... *B62D 55/244* (2013.01); *B62D 55/253* (2013.01)

(58) Field of Classification Search
CPC .................................................. B62D 55/253
(Continued)

(56) References Cited

U.S. PATENT DOCUMENTS 4,721,498 A * 1/1988 Grob ......................... F16G 1/08
474/261
5,145,242 A * 9/1992 Togashi ................. B62D 55/24
305/171

(Continued)

FOREIGN PATENT DOCUMENTS

CN    102131693 A    7/2011
CN    203332253 U    12/2013
(Continued)

OTHER PUBLICATIONS

International Search Report issued in International Application No. PCT/JP2016/066691 dated Jun. 28, 2016.
(Continued)

*Primary Examiner* — S. Joseph Morano
*Assistant Examiner* — Jean W Charleston
(74) *Attorney, Agent, or Firm* — Solaris Intellectual Property Group, PLLC

(57) ABSTRACT

An elastic crawler includes an elastic crawler body and plural cord layers. The elastic crawler body is shaped into an endless loop. The plural cord layers are formed by plural cords covered by the elastic body, and the plural cord layers are embedded in the elastic crawler body. Respective cords included in mutually adjacent cord layers are disposed so as to intersect each other when viewed along a thickness direction of the elastic crawler body, and in at least one pair of adjacent cord layers inside at least a partial region of the elastic crawler body, a total area of portions where the respective cords included in each layer of the adjacent cord layers overlap with each other, is smaller than a total area of portions where respective regions of each layer of the adjacent cord layers in which none of the cords are disposed overlap with each other.

20 Claims, 6 Drawing Sheets

(58) Field of Classification Search
USPC .............. 152/166, 167, 170, 173, 177, 178
See application file for complete search history.

(56) References Cited

U.S. PATENT DOCUMENTS

| | | | | |
|---|---|---|---|---|
| 7,325,888 | B2* | 2/2008 | Fujita | B62D 55/244 305/166 |
| 7,641,292 | B2* | 1/2010 | Matsuo | B62D 55/244 305/166 |
| 7,896,440 | B2* | 3/2011 | Tsai | A47C 1/03 297/353 |
| 2002/0067074 | A1 | 6/2002 | Katayama et al. | |
| 2002/0163252 | A1* | 11/2002 | Tsuru | B62D 55/244 305/167 |
| 2003/0111903 | A1 | 6/2003 | Katayama et al. | |
| 2006/0232129 | A1* | 10/2006 | Fujita | B62D 55/244 305/170 |
| 2009/0200863 | A1* | 8/2009 | Sugihara | B62D 55/253 305/169 |
| 2011/0169324 | A1 | 7/2011 | Ijiri | |
| 2018/0154958 | A1 | 6/2018 | Matsuo | |

FOREIGN PATENT DOCUMENTS

| | | |
|---|---|---|
| JP | H07-223565 A | 8/1995 |
| JP | S63-502978 A | 11/1998 |
| JP | 2002-166862 A | 6/2002 |
| JP | 2003-267276 A | 9/2003 |
| JP | 2008-062830 A | 3/2008 |
| WO | 2002/0012054 A1 | 2/2002 |
| WO | 2016/195103 A1 | 12/2016 |

OTHER PUBLICATIONS

Examination Search Report of the Canadian office action dated Sep. 27, 2018, from the CIPO in a Canadian patent application corresponding to the instant patent application.

Search Report of the Chinese office action dated Jan. 25, 2019, from the SIPO in a Chinese patent application corresponding to the instant patent application.

* cited by examiner

ELASTIC CRAWLER

TECHNICAL FIELD

One aspect of the present invention relates to an elastic crawler.

BACKGROUND ART

Japanese Patent Application Laid-Open (JP-A) No. 2008-166862 describes a rubber crawler in which cords are arranged inside a crawler body.

SUMMARY OF INVENTION

Technical Problem

However, due to entrainment of the elastic crawler on a sprocket or an idler, or due to pressure on the elastic crawler from rollers, distortion occurs within the crawler. As a result, cord layers embedded in the elastic crawler may separate from one another.

In consideration of the above circumstances, an object of one aspect of the present invention is to suppress separation of cord layers embedded in an elastic crawler.

Solution to Problem

An elastic crawler of a first aspect of the present invention includes an elastic crawler body and plural cord layers. The elastic crawler body is formed by an elastic body shaped into an endless loop. The plural cord layers are formed by plural cords arrayed spaced apart and covered by the elastic body, and the plural cord layers are embedded in the elastic crawler body. Respective cords included in mutually adjacent cord layers are disposed so as to intersect each other when viewed along a thickness direction of the elastic crawler body, and in at least one pair of adjacent cord layers inside at least a partial region of the elastic crawler body, a total area of portions where the respective cords included in each layer of the adjacent cord layers overlap with each other, when viewed along the thickness direction, is smaller than a total area of portions where respective regions of each layer of the adjacent cord layers in which none of the cords are disposed overlap with each other when viewed along the thickness direction.

The elastic body is filled into regions in which no cord is disposed in each of the cord layers of the elastic crawler. When this is performed, the elastic body is filled into portions of two adjacent cord layers where respective regions of each layer in which no cords are disposed overlap with each other when viewed along the thickness direction of the elastic crawler body, such that the elastic body extends continuously across the two adjacent cord layers.

Namely, the two adjacent cord layers are coupled together by the elastic body running through the two adjacent layers at portions where respective regions of each layer in which no cords are disposed overlap with each other.

In contrast, at portions where the respective cords included in each layer of the two adjacent cord layers overlap with each other when viewed along the thickness direction of the elastic crawler body, due to the presence of the cords, the elastic body is not continuous, with the elastic body being interposed between adjacent cords. The elastic body is therefore unable to run through and couple the two cord layers together at these portions.

Namely, in the elastic crawler of the first aspect of the present invention, in at least one pair of mutually adjacent cord layers inside at least a partial region of the elastic crawler body, as viewed along the thickness direction of the elastic crawler body, a total area of portions where the elastic body runs through and couples the cord layers together (namely, of portions where respective regions of each layer in which none of the cords are disposed overlap with each other) is greater than a total area of portions where the respective cords of the two layers overlap with each other.

This enables, in at least a partial region of the elastic crawler body, separation of at least one pair of mutually adjacent cord layers embedded in the elastic crawler to be effectively suppressed.

An elastic crawler of a second aspect of the present invention includes an elastic crawler body and plural cord layers. The elastic crawler body is formed by an elastic body shaped into an endless loop. The plural cord layers are formed by plural cords arrayed spaced apart and covered by the elastic body, and the plural cord layers are embedded in the elastic crawler body. Respective cords included in mutually adjacent cord layers are disposed so as to intersect each other when viewed along a thickness direction of the elastic crawler body, and respective cords included in each layer of at least one pair of adjacent cord layers inside at least a partial region of the elastic crawler body satisfying Equation (1) below.

$$K_a \times K_{a+1} < (1-K_a) \times (1-K_{a+1}) \qquad (1)$$

In Equation (1), $K_a$ expresses a ratio ($\phi_a/(\phi_a+D_a)$) between a diameter ($\phi_a$) of one cord selected from plural cords included in an $a^{th}$ layer from an inner circumferential face side of the elastic crawler body and a pitch of the one cord ($\phi_a+D_a$ ($D_a$ expresses an inter-cord distance between the one cord and another cord adjacent to the one cord in layer a)). $1-K_a$ expresses a ratio ($D_a/(\phi_a+D_a)$) between the inter-cord distance ($D_a$) and the pitch of the one cord ($\phi_a+D_a$). $K_{a+1}$ expresses a ratio ($\phi_{a-1}/(\phi_{a+1}+D_{a+1})$) between a diameter ($\phi_{a+1}$) of one cord selected from plural cords included in an $(a+1)^{th}$ layer from the inner circumferential face side of the elastic crawler body and a pitch of the one cord ($\phi_{a+1}+D_{a+1}$ ($D_{a+1}$ expresses an inter-cord distance between the one cord and another cord adjacent to the one cord in layer (a+1))). $1-K_{a+1}$ expresses a ratio ($D_{a+1}/(\phi_{a-1}+D_{a+1})$) between the inter-cord distance ($D_{a+1}$) and the pitch of the one cord ($\phi_{a+1}+D_{a+1}$). Note that $1 \le a \le X-1$ ($X \ge 2$, with X expressing a number of the cord layers).

Note that the one cord selected from plural cords included in layer a or layer (a+1) means any one cord selected from out of the plural cords included in layer a or layer (a+1).

Layer a and layer (a+1) are the $a^{th}$ and the $(a+1)^{th}$ cord layers as counted from the inner circumferential face side of the elastic crawler body, respectively, and layer a and layer (a+1) are mutually adjacent layers.

In the second aspect of the present invention, plural cord layers are embedded in the elastic crawler body, and the respective cords included in mutually adjacent cord layers are disposed so as to intersect with each other when viewed along the thickness direction of the elastic crawler body.

Inside at least a partial region of the elastic crawler body, the relationship expressed by $K_a \times K_{a+1} < (1-K_a) \times (1-K_{a+1})$ holds for at least one pair of mutually adjacent cord layers, namely, between layer a and layer (a+1).

Namely, inside at least a partial region of the elastic crawler body, one pair of mutually adjacent cord layers from out of the plural cord layers embedded in three of more layers in the elastic crawler body satisfies $K_a \times K_{a+1} < (1-$ $K_a)\times(1-K_{a+1})$, indicating that in these adjacent layers, as viewed along the thickness direction of the elastic crawler body, areas of portions at which arbitrary cords overlap with each other are all smaller than areas of portions at which regions, which are adjacent to these arbitrary cords and in which no cords are disposed, overlap with each other.

Namely, as viewed along the thickness direction of the elastic crawler body, with regards to all of the cords in at least a partial region of the elastic crawler body, this indicates that the area of portions where respective cords in the adjacent layers overlap with each other is smaller than the area of portions where regions that are adjacent to these respective cords and in which no cords are disposed overlap with each other.

As described above, the elastic body is filled into portions of two adjacent layers where respective regions in which no cords are disposed overlap with each other, such that the elastic body extends continuously across the two adjacent cord layers. Namely, the two adjacent cord layers are coupled together by the elastic body running through the two layers at portions where respective regions of the two adjacent layers in which no cords are disposed overlap with each other. In contrast, due to the presence of the cords, the elastic body is not continuous at portions where the respective cords included in the two adjacent cord layers overlap with each other, and thus the elastic body is unable to run through and couple the two cord layers together at these portions.

In the elastic crawler of the second aspect of the present invention, inside at least a partial region, the relationship of Equation (1) holds for at least one pair of mutually adjacent cord layers from out of the plural cord layers embedded in three of more layers in elastic crawler body. Thus, in at least a partial region of the elastic crawler body, as viewed along the thickness direction of the elastic crawler body, the total area of portions where the elastic body runs through and couples together at least one pair of mutually adjacent cord layers is greater than the total area of portions where the respective cords of the two layers overlap with each other.

This enables, in at least a partial region of the elastic crawler body, separation of the at least one pair of mutually adjacent cord layers embedded in the elastic crawler to be suppressed.

An elastic crawler of a third aspect of the present invention is the elastic crawler of the second aspect, wherein the plural cord layers include a main cord layer and an intersecting cord layer adjacent to the main cord layer. The main cord layer includes a main cord that is wound around a crawler circumferential direction of the elastic crawler body and that is covered by the elastic body. The intersecting cord layer includes an intersecting cord that intersects with the main cord when viewed along the thickness direction of the elastic crawler body, and that is covered by the elastic body. The main cord included in the main cord layer and the intersecting cord included in the intersecting cord layer satisfy Equation (1).

In the third aspect of the present invention, as viewed along the thickness direction of the elastic crawler body, the area of portions where the elastic body runs through and couples together the main cord layer and the intersecting cord layer that is adjacent to the main cord layer is greater than the area of portions where the respective cords of the two layers overlap with each other. This enables separation of the main cord layer and the intersecting cord layer adjacent to the main cord layer embedded in the elastic crawler to be suppressed.

An elastic crawler of a fourth aspect of the present invention is the elastic crawler of the third aspect, wherein a pitch of the intersecting cord is more than two times a diameter of the intersecting cord.

In the fourth aspect of the present invention, making the pitch of the intersecting cord larger enables the pitch of the main cord to be made smaller while still satisfying Equation (1).

This enables layer separation of the main cord layer and the intersecting cord layer adjacent to the main cord layer to be suppressed without taking away from the strength of the elastic crawler body with respect to tension acting along the crawler circumferential direction.

An elastic crawler of a fifth aspect of the present invention is the elastic crawler of the second aspect, wherein the respective cords included in all mutually adjacent cord layers satisfy Equation (1).

In the fifth aspect of the present invention, as viewed along the thickness direction of the elastic crawler body, the area of portions where the elastic body runs through and couples together the two cord layers of all mutually adjacent cord layers is greater than the area of portions where the respective cords in the two cord layers overlap with each other.

This enables separation of the respective cord layers of all mutually adjacent cord layers embedded in the elastic crawler to be suppressed.

An elastic crawler of a sixth aspect of the present invention is the elastic crawler of any one of the second aspect to the fifth aspect, wherein when viewed along the thickness direction of the elastic crawler body, the elastic crawler includes a portion in which the elastic body runs through all of the cord layers so as to couple the cord layers together.

In the sixth aspect of the present invention, the elastic crawler includes a portion in which the elastic body runs through all of the cord layers so as to couple the cord layers together, as viewed along the thickness direction of the elastic crawler body. This enables the advantageous effect of suppressing separation of cord layers among the cord layers embedded in the elastic crawler to be heightened.

An elastic crawler of a seventh aspect of the present invention is the elastic crawler of any one of the second aspect to the sixth aspect, wherein each of the cords satisfying Equation (1) also satisfies the following Equation (2) when viewed along the thickness direction of the elastic crawler body.

$$K_a \times K_{a+1} < (1-K_1) \times (1-K_2) \times \ldots \times (1-K_x) \qquad (2)$$

In the seventh aspect of the present invention, the area of portions where the elastic body runs through and couples together all of the cord layers is greater than the area of portions where the cords in any two adjacent cord layers overlap with each other, as viewed along the thickness direction of the elastic crawler body.

This enables the advantageous effect of suppressing separation of cord layers among the cord layers embedded in the elastic crawler to be heightened.

An elastic crawler of an eighth aspect of the present invention is any one aspect out of the second aspect to the seventh aspect, wherein the inner circumferential face of the elastic crawler body is provided with projections spaced apart in a crawler circumferential direction, and the partial region is a region to a crawler width direction outside of the projections.

In the eighth aspect of the present invention, the inner circumferential face of the elastic crawler body is provided with projections spaced apart in the crawler circumferential direction, and as viewed along the thickness direction of the elastic crawler body, the area of portions where the any two adjacent cord layers are coupled together by the elastic body is greater than the area of portions where the respective cords in these two layers overlap with each other is to the crawler width direction outside of the projections.

This enables separation of cord layers embedded in the elastic crawler, which is liable to distort due to entrainment on a sprocket or an idler, or due to pressure from rollers, to be suppressed at the width direction outside of the projections on the elastic crawler body.

Advantageous Effects of Invention

With an elastic crawler according to an aspect of the present invention, separation of cord layers embedded in the elastic crawler can be suppressed.

DESCRIPTION OF EMBODIMENTS

First Exemplary Embodiment

Explanation follows regarding a rubber crawler 80, serving as an example of an elastic crawler according to a first exemplary embodiment of the present invention, with reference to the drawings.

Figure 1:
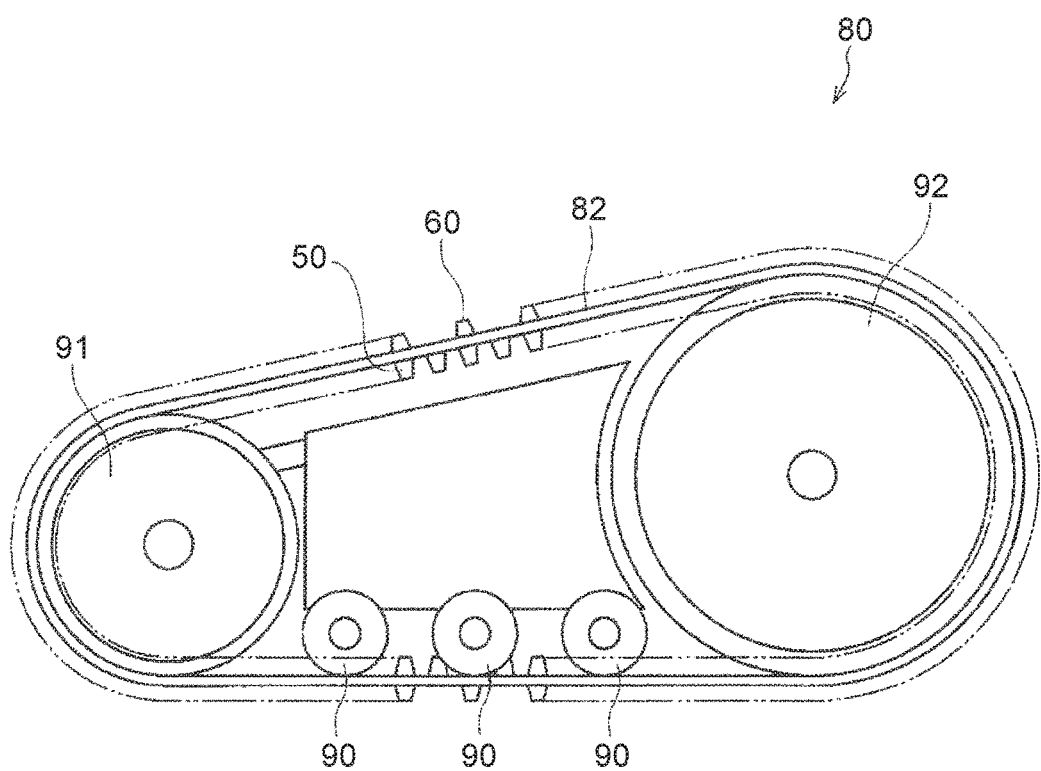
FIG. 1 is a side view of an elastic crawler according to a first exemplary embodiment of the present invention.

As illustrated in FIG. 1, the rubber crawler 80 of the present exemplary embodiment is a continuous track that is employed entrained around a sprocket 91 and an idler 92 so as to encircle the sprocket 91, the idler 92, plural rollers 90, and the like.

Figure 2:
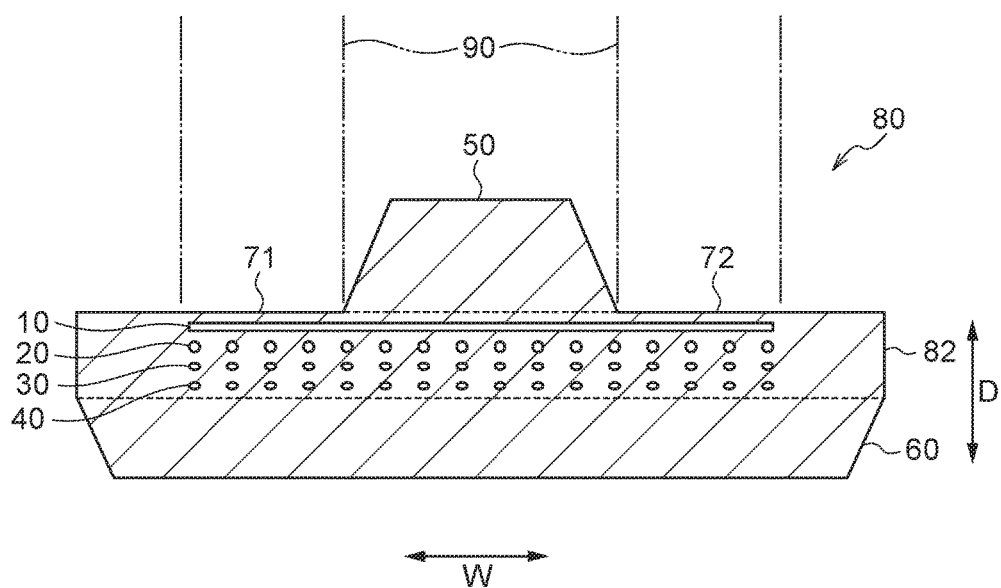
FIG. 2 is a lateral cross-section of an elastic crawler according to the first exemplary embodiment of the present invention.

FIG. 2 is a lateral cross-section taken along an axis that is perpendicular to an axis in a crawler circumferential direction of the rubber crawler 80 of the first exemplary embodiment. Note that the crawler circumferential direction is a direction running along the direction of rotation of the rubber crawler 80, and may also be called a longitudinal direction. In addition, a crawler width direction is a direction orthogonal to the direction of rotation of the rubber crawler 80, and a crawler thickness direction is a direction looking on either the inner circumferential face side or the outer circumferential face side of the rubber crawler 80.

Figure 3:
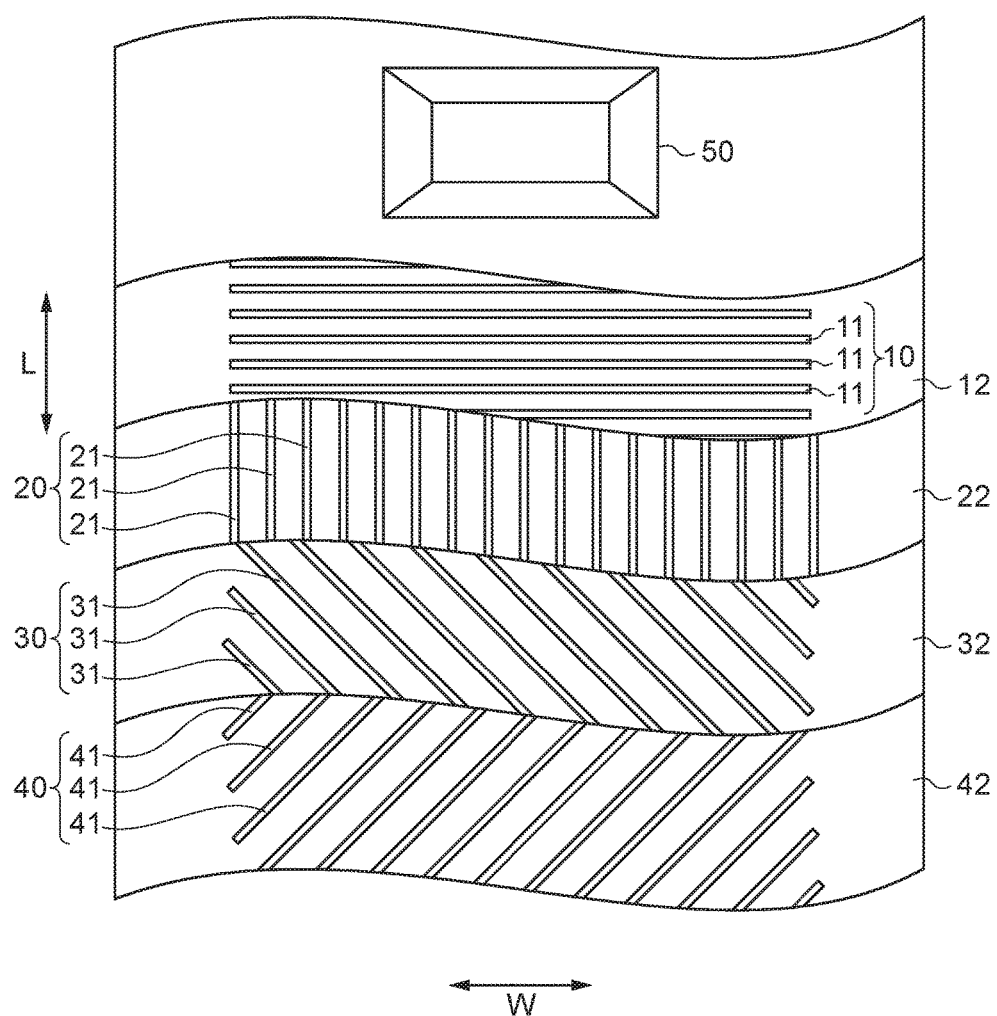
FIG. 3 is a partially cut-away plan view cross-section of an elastic crawler according to the first exemplary embodiment of the present invention.

In FIG. 2, the crawler width direction is indicated by the arrow W and the crawler thickness direction is indicated by the arrow D. In FIG. 3, the crawler width direction is indicated by the arrow W and the crawler circumferential direction is indicated by the arrow L.

The rubber crawler 80 is configured including a rubber crawler body 82 that is formed by rubber, serving as an example of an elastic body, shaped into an endless loop, projections 50, and lugs 60. Note that the rubber crawler body 82 is an example of an elastic crawler body in the present exemplary embodiment.

Within the rubber crawler body 82, a 0° cord layer 10, a main cord layer 20, a bias cord layer 30, and a bias cord layer 40 are stacked in sequence from the inner circumferential face side (the upper side in FIG. 2) of the rubber crawler body 82.

The projections 50 project out from a central portion of the inner circumferential face of the rubber crawler body 82 with uniform pitch (spacing) in the circumferential direction of the rubber crawler 80.

The projections 50 mesh with the sprocket 91 to transmit drive force to the rubber crawler 80. Further, the crawler width direction outsides of the projections 50, in other words left and right inner circumferential faces 71, 72 of the rubber crawler body 82, serve as travel faces for the rollers 90, which are illustrated using double-dotted dashed lines.

The lugs 60 project out from the outer circumferential face of the rubber crawler body 82 at a uniform pitch in the circumferential direction of the rubber crawler 80.

As illustrated in FIG. 2 and FIG. 3, the 0° cord layer 10 has an endless belt shape, with 0° cords 11, which are embedded oriented at right angles to the direction of a main cord 21 that will be described later, being embedded in the 0° cord layer 10 at equal spacings in the crawler circumferential direction of the rubber crawler body 82.

The 0° cords 11 are reinforcing steel cords for raising the width direction rigidity of the rubber crawler 80, and are each configured of plural strands that have been twisted together. Note that in the present exemplary embodiment, for example, each of these strands is formed by plural filaments that have been twisted together. Further, in the present exemplary embodiment, the 0° cords 11 are embedded in the rubber crawler body 82 so as to run along the crawler width direction of the rubber crawler 80. The rubber crawler body 82 is therefore less liable to deform in the crawler width direction. Note that the 0° cord layer 10 is an example of an intersecting cord layer in the present exemplary embodiment.

The main cord layer 20 is disposed on the outer circumferential face side of the 0° cord layer 10. The main cord layer 20 has an endless belt shape, and is configured with the main cord 21 embedded with equal spacings across the crawler width direction of the rubber crawler body 82.

The main cord 21 is embedded in the rubber crawler body 82 wound into a helical shape around the crawler circumferential direction of the rubber crawler 80. The main cord 21 is thus configured such that the spacings in the crawler width direction are equal around the entire crawler circumferential direction of the rubber crawler 80.

Note that the main cord 21 is steel cord embedded to augment the tensile strength of the rubber crawler 80 in the crawler circumferential direction, and is configured of plural strands that have been twisted together. Note that in the present exemplary embodiment, for example, each of these strands is formed from plural filaments that have been twisted together. The tensile strength of the rubber crawler body 82 is thus increased in the crawler circumferential direction.

The bias cord layer 30 is disposed on the outer circumferential face side of the main cord layer 20. The bias cord layer 30 has an endless belt shape, and is configured with bias cords 31 embedded at equal spacings across the crawler width direction of the rubber crawler body 82. Further, the bias cord layer 30 is configured with the bias cords 31 embedded at equal spacings in the crawler circumferential direction.

Plural of the bias cords 31 are disposed parallel to each other, each extending at an angle with respect to the crawler circumferential direction, and the bias cords 31 intersect the main cord 21 and bias cords 41, described later, when looking at the rubber crawler 80 from the inner circumferential face thereof. The bias cords 31 and the bias cords 41 are angled in opposite directions to each other with respect to the crawler circumferential direction. Note that "looking at the rubber crawler 80 from the inner circumferential face thereof" is one way of "viewing along the thickness direction of the rubber crawler body 82".

Note that the bias cords 31 are reinforcing steel cords for preventing torsion of the main cord 21, and are each configured of plural strands that have been twisted together. Note that in the present exemplary embodiment, for example, each of these strands is formed from plural filaments that have been twisted together. The bias cords 31 employ steel cords that have a smaller diameter than that of the main cord 21. The ability of the rubber crawler body 82 to hold a straight line is therefore raised. Note that the bias cord layer 30 is an example of an intersecting cord layer in the present exemplary embodiment.

The bias cord layer 40 is disposed on the outer circumferential face side of the bias cord layer 30. The bias cord layer 40 has an endless belt shape, and is configured with bias cords 41 embedded at equal spacings across the crawler width direction of the rubber crawler body 82. Further, the bias cord layer 40 is configured with the bias cords 41 embedded at equal spacings in the crawler circumferential direction.

Plural of the bias cords 41 are disposed parallel to each other, extending at an angle with respect to the crawler circumferential direction, and the bias cords 41 are disposed intersecting the bias cords 31 when looking at the rubber crawler 80 from the inner circumferential face thereof. The bias cords 41 and the bias cords 31 are angled in opposite directions to each other with respect to the crawler circumferential direction.

Note that the bias cords 41 are reinforcing steel cords for preventing torsion of the main cord 21, and are each configured by plural strands that have been twisted together. Note that in the present exemplary embodiment, for example, each of these strands is formed from plural filaments that have been twisted together. The bias cords 41 employ steel cords that have a smaller diameter than that of the main cord 21. The ability of the rubber crawler body 82 to hold a straight line is therefore raised.

Figure 4:
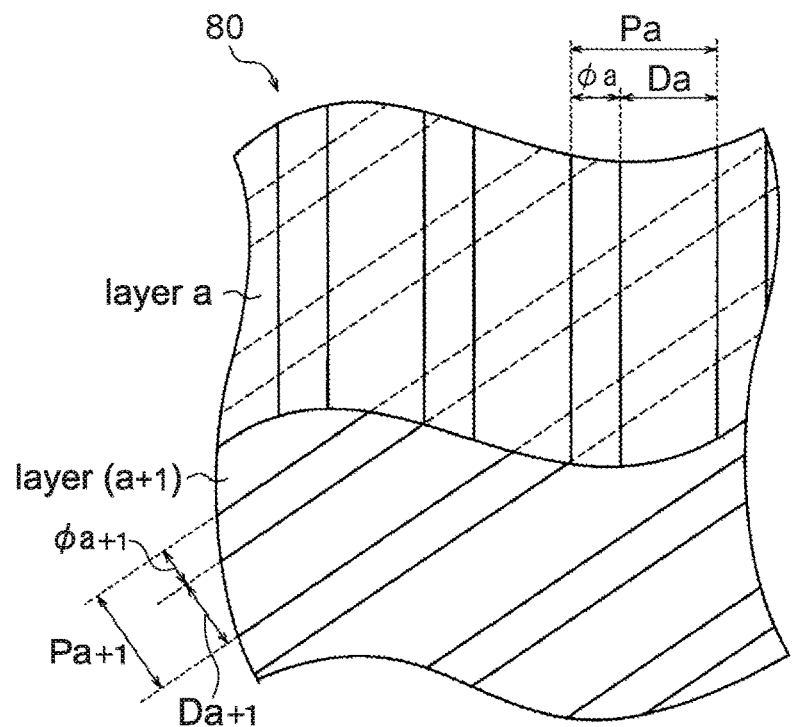
FIG. 4 is an enlarged plan view of a portion of an elastic crawler according to the first exemplary embodiment of the present invention.

Explanation follows regarding the relationships between the layers, with reference to FIG. 4. Note that in the following explanation, the 0° cord layer 10, the main cord layer 20, the bias cord layer 30, and the bias cord layer 40 are respectively referred to as a first layer 10, a second layer 20, a third layer 30, and a fourth layer 40.

In the rubber crawler 80 of the present exemplary embodiment, the cords included in each layer satisfy Equation (1-1) below.

$$K_a \times K_{a+1} < (1-K_a) \times (1-K_{a+1}) \tag{1-1}$$

In Equation (1-1), $K_a$, as illustrated in FIG. 4, expresses a ratio between the diameter ($\phi_a$) of one cord selected from the plural cords included in the $a^{th}$ layer from the inner circumferential face side of the rubber crawler 80, and the pitch of the one cord ($\phi_a+D_a$) (simply referred to as "pitch" hereafter). Note that in FIG. 4, pitch is indicated as $P_a$. Namely, $K_a$ is expressed by Equation (A).

$$K_a = \phi_a/(\phi_a+D_a) \tag{A}$$

Note that $D_a$ expresses the inter-cord distance between the one cord and another cord adjacent to the one cord in layer a.

Further, in Equation (1), $1-K_a$ expresses a ratio between inter-cord distance ($D_a$) and pitch ($\phi_a+D_a$). Namely, $1-K_a$ is expressed by Equation (B).

$$1-K_a = D_a/(\phi_a+D_a) \tag{B}$$

Similarly, in Equation (1-1), $K_{a+1}$, as illustrated in FIG. 4, expresses a ratio between the diameter ($\phi_{a+1}$) of one cord selected from the plural cords included in the $(a+1)^{th}$ layer from the inner circumferential face side of the rubber crawler 80, and its pitch ($\phi_{a+1}+D_{a+1}$). Namely, $K_{a+1}$ is expressed by Equation (C).

$$K_{a+1} = \phi_{a+1}/(\phi_{a+1}+D_a) \tag{C}$$

Note that $D_{a+1}$ expresses the inter-cord distance between the one cord and another cord adjacent to the one cord in layer (a+1).

Further, in Equation (1-1), $1-K_{a+1}$ expresses a ratio between inter-cord distance ($D_{a+1}$) and pitch ($\phi_{a+1}+D_{a+1}$). Namely, $1-K_{a+1}$ is expressed by Equation (D).

$$1-K_{a+1} = D_{a+1}/(\phi_{a+1}+D_{a+1}) \tag{D}$$

Substituting Equations (A), (B), (C), and (D) into Equation (1-1) enables Equation (1-1) to be rewritten as follows.

$$\phi_a \times \phi_{a+1} < D_a \times D_{a+1} \tag{1-2}$$

Figure 5:
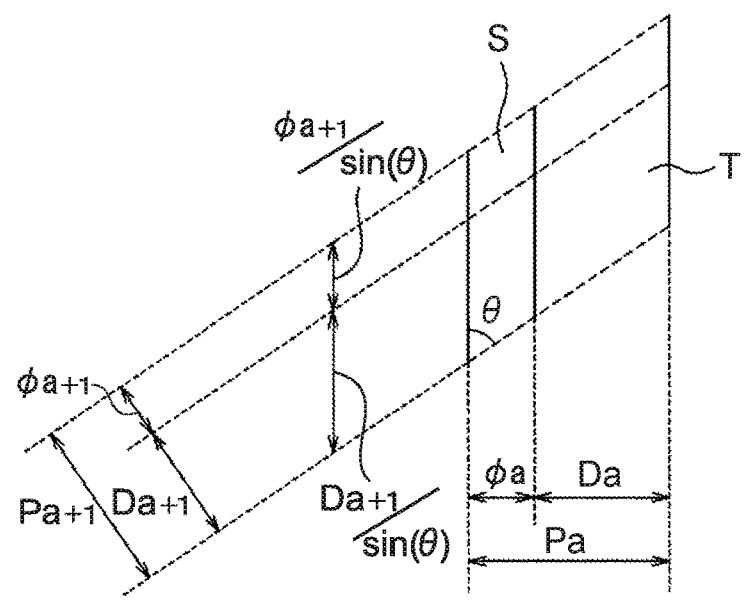
FIG. 5 is an enlarged plan view of a portion of an elastic crawler according to the first exemplary embodiment of the present invention.

FIG. 5 is a unit configuration diagram illustrating a single pitch of each of layer a and layer (a+1). In layer a and layer (a+1) of the rubber crawler 80, configuration is such that this unit configuration is carried out in both the crawler circumferential direction and the crawler width direction.

In FIG. 5, when viewed from one crawler thickness direction side of the rubber crawler 80, and when viewed from the inner circumferential face side of the rubber crawler 80 in the present exemplary embodiment, the angle formed between a cord embedded in layer a and a cord embedded in layer (a+1) is given as θ.

Here, when looking at the rubber crawler 80 from the inner circumferential face thereof, the area of the portion where the cord embedded in layer a and the cord embedded in layer (a+1) overlap with each other is given as S, and the area of the portion where regions in which no cord is disposed overlap with each other is given as T. S and T are respectively expressed as follows.

$$S = \phi_a \times \phi_{a-1}/\sin(\theta) \tag{E}$$

$$T = D_a \times D_{a+1}/\sin(\theta) \tag{F}$$

Note that the diameter $\phi_a$, pitch $P_a$, and inter-cord distance $D_a$ in the present exemplary embodiment are measured by performing X-ray imaging of the rubber crawler 80 along the crawler thickness direction.

In the first exemplary embodiment, all cords included in each layer satisfy Equation (1-1), and therefore Equation (1-2) is also satisfied. Substituting Equations (E) and (F) into Equation (1-2) and rewriting Equation (1-2) in terms of the relationship between areas S and T enables Equation (1-2) to be rewritten as follows.

$$S \times \sin(\theta) < T \times \sin(\theta)$$

Namely, all cords included in each layer satisfy the following.

$$S < T \qquad (1\text{-}3)$$

In other words, looking at the rubber crawler 80 from the inner circumferential face thereof, in all regions along the crawler circumferential direction, across the crawler width direction, the area of portions where the 0° cords 11 and the main cord 21 overlap is smaller than the area of portions where regions in which no 0° cords 11 or main cord 21 is disposed overlap with each other.

Portions where no cord from either cord layer is disposed are filled in with rubber such that the rubber extends continuously across the two adjacent cord layers. The two adjacent cord layers are thus coupled together by rubber that runs through the two layers at portions where regions where no cord is disposed overlap with each other.

Namely, looking at the rubber crawler 80 from the inner circumferential face thereof, in all regions along the crawler circumferential direction, across the crawler width direction, the area of portions running through and coupling together the first layer 10 and the second layer 20 is greater than the area of portions where the respective cords in the first layer 10 and the second layer 20 overlap with each other.

Similarly, looking at the rubber crawler 80 from the inner circumferential face thereof, in all regions along the crawler circumferential direction, across the crawler width direction, the area of portions where the main cord 21 and the bias cords 31 overlap is smaller than the area of portions where regions in which no main cord 21 or bias cords 31 are disposed overlap with each other.

Namely, looking at the rubber crawler 80 from the inner circumferential face thereof, in all regions along the crawler circumferential direction, across the crawler width direction, the area of portions running through and coupling together the second layer 20 and the third layer 30 is greater than the area of portions where the respective cords in the second layer 20 and the third layer 30 overlap with each other.

Similarly, looking at the rubber crawler 80 from the inner circumferential face thereof, in all regions along the crawler circumferential direction, across the crawler width direction, the area of portions where the bias cords 31 and the bias cords 41 overlap is smaller than the area of portions where regions in which no bias cords 31 or bias cords 41 are disposed overlap with each other.

Namely, looking at the rubber crawler 80 from the inner circumferential face thereof, in all regions along the crawler circumferential direction, across the crawler width direction, the area of portions running through and coupling together the third layer 30 and the fourth layer 40 is greater than the area of portions where the respective cords in the third layer 30 and the fourth layer 40 overlap with each other.

Effects

Explanation follows regarding the effects of the rubber crawler 80 of the first exemplary embodiment, configured as described above.

Regarding the rubber crawler 80 of the first exemplary embodiment, when looking at the rubber crawler 80 from the inner circumferential face thereof, in all regions along the crawler circumferential direction, across the crawler width direction, the area of portions where rubber runs through and couples together any two adjacent cord layers is greater than the area of portions where the respective cords in these two cord layers overlap with each other.

During travel, a compressive force is applied to each of the cord layers when the rubber crawler 80 is pressed by the rollers 90. The rollers 90 press on the rubber crawler 80 from when they dig in to when they kick out, and thus the compressive force acts along the crawler thickness direction and directions close to the crawler thickness direction.

At portions where the respective cords in two adjacent cord layers overlap with each other, the cords press on each other across the rubber between the cords, and since compressive force also acts along directions near to the crawler thickness direction, namely, also acts on directions offset from the crawler thickness direction, the cords also attempt to move in the horizontal direction.

When this occurs, shear force acts on the rubber between the cords along the direction in which the cords are attempting to move. This shear force damages the rubber between the cords.

In the rubber crawler 80 of the present exemplary embodiment, since the rubber runs through and couples together two adjacent cord layers, damage to rubber between the cords is suppressed from propagating in the horizontal direction.

The rubber crawler 80 of the present exemplary embodiment thereby enables separation of the embedded cord layers to be suppressed.

Second Exemplary Embodiment

Explanation follows regarding a rubber crawler 81, serving as an example of an elastic crawler of a second exemplary embodiment, with reference to the drawings. Note that portions having similar configuration to that of the first exemplary embodiment are appended with the same reference numerals and explanation thereof is omitted.

Figure 6:
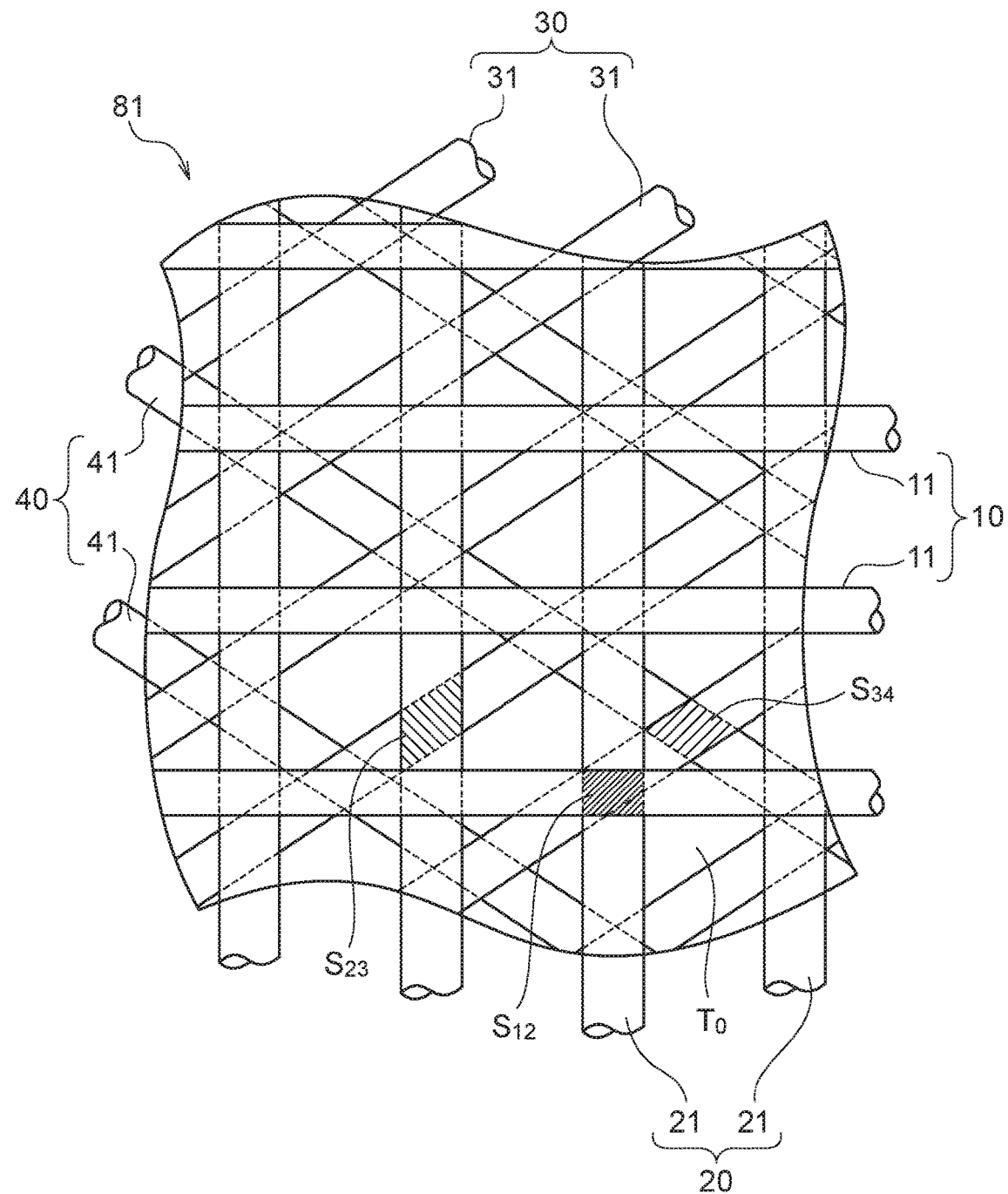
FIG. 6 is an enlarged plan view of a portion of an elastic crawler according to a second exemplary embodiment of the present invention.

FIG. 6 is a partial view of the rubber crawler 81 of the second exemplary embodiment as viewed from the inner circumferential face side. Note that rubber is omitted from illustration in FIG. 6.

Within the rubber crawler 81 of the second exemplary embodiment, a 0° cord layer 10, a main cord layer 20, a bias cord layer 30, and a bias cord layer 40 are stacked in sequence from the inner circumferential face side of the rubber crawler 81.

The 0° cord layer 10, the main cord layer 20, the bias cord layer 30, and the bias cord layer 40 are respectively embedded with 0° cords 11, a main cord 21, bias cords 31, and bias cords 41.

The total area of portions where the 0° cords 11 and the main cord 21 overlap with each other, looking at the rubber crawler 81 from the inner circumferential face thereof, is expressed as $S_{12}$.

The total area of portions where the main cord 21 and the bias cords 31 overlap with each other, looking at the rubber crawler 81 from the inner circumferential face thereof, is expressed as $S_{23}$.

The total area of portions where the bias cords 31 and the bias cords 41 overlap with each other, looking at the rubber crawler 81 from the inner circumferential face thereof, is expressed as $S_{34}$.

The total area of portions where respective regions in which none out of the 0° cords 11, the main cord 21, the bias cords 31, or the bias cords 41 are disposed overlap with each other, looking at the rubber crawler 81 from the inner circumferential face thereof, is expressed as $T_0$.

Note that in FIG. 6, although only one location is indicated for each of $S_{12}$, $S_{23}$, $S_{34}$, and $T_0$, each of $S_{12}$, $S_{23}$, $S_{34}$, and $T_0$ represents the total area of such portions across the crawler width direction in all regions along the crawler circumferential direction, and is not limited to the region illustrated in FIG. 6.

The following hold in the rubber crawler 81 of the second exemplary embodiment.

$$S_{12} < T_0,\ S_{23} < T_0,\ \text{and}\ S_{34} < T_0$$

In other words, for any a ($1 \leq a \leq 3$), the following holds.

$$K_a \times K_{a+1} < (1-K_1) \times (1-K_2) \times (1-K_3) \times (1-K_4) \tag{2}$$

That is to say, looking at the rubber crawler 81 from the inner circumferential face thereof, in all regions along the crawler circumferential direction, across the crawler width direction, the total area of portions where the 0° cords 11 and the main cord 21 overlap is less than the total area of portions at which regions, in which none out of the 0° cords 11, the main cord 21, the bias cords 31, or the bias cords 41 are disposed, overlap with each other.

Namely, looking at the rubber crawler 81 from the inner circumferential face thereof, in all regions along the crawler circumferential direction, across the crawler width direction, the area of portions where the first layer 10, the second layer 20, the third layer 30, and the fourth layer 40 are continuously coupled together by rubber that runs therethrough is greater than the area of portions where respective cords in the first layer 10 and the second layer 20 overlap with each other.

Similarly, looking at the rubber crawler 81 from the inner circumferential face thereof, in all regions along the crawler circumferential direction, across the crawler width direction, the total area of portions where the main cord 21 and the bias cords 31 overlap is less than the total area of portions at which regions, in which none out of the 0° cords 11, the main cord 21, the bias cords 31, or the bias cords 41 are disposed, overlap with each other.

Namely, looking at the rubber crawler 81 from the inner circumferential face thereof, in all regions along the crawler circumferential direction, across the crawler width direction, the area of portions where the first layer 10, the second layer 20, the third layer 30, and the fourth layer 40 are continuously coupled together by an elastic body that runs therethrough is greater than the area of portions where respective cords in the second layer 20 and the third layer 30 overlap with each other.

Similarly, looking at the rubber crawler 81 from the inner circumferential face thereof, in all regions along the crawler circumferential direction, across the crawler width direction, the total area of portions where the bias cords 31 and the bias cords 41 overlap is less than the total area of portions at which regions, in which none out of the 0° cords 11, the main cord 21, the bias cords 31, or the bias cords 41 are disposed, overlap with each other.

Namely, looking at the rubber crawler 81 from the inner circumferential face thereof, in all regions along the crawler circumferential direction, across the crawler width direction, the area of portions where the first layer 10, the second layer 20, the third layer 30, and the fourth layer 40 are continuously coupled together by an elastic body that runs therethrough is greater than the area of portions where respective cords in the third layer 30 and the fourth layer 40 overlap with each other.

Effects

Explanation follows regarding the effects of the rubber crawler 81 of the second exemplary embodiment, configured as described above.

Regarding the rubber crawler 81 of the second exemplary embodiment, when looking at the rubber crawler 81 from the inner circumferential face thereof, in all regions along the crawler circumferential direction, across the crawler width direction, the area of portions where the first layer 10, the second layer 20, the third layer 30, and the fourth layer 40 are continuously coupled together by an elastic body that runs therethrough is greater than the area of portions where the respective cords in any two adjacent cord layers overlap with each other.

Accordingly, the advantageous effect of enabling separation of embedded cord layers to be suppressed is heightened in comparison to the rubber crawler 80 of the first exemplary embodiment.

Other Exemplary Embodiments

Explanation has been given regarding examples of exemplary embodiments of the present invention. However, the exemplary embodiments of the present invention are not limited to the above, and obviously various other modifications may be implemented within a range not departing from the spirit of the present disclosure.

For example, although the rubber crawler 80 is configured with the 0° cord layer 10, the main cord layer 20, the bias cord layer 30, and the bias cord layer 40 embedded in sequence from the inner circumferential face side, so long as at least two cord layers are provided, the 0° cord layer 10 may be omitted, and the bias cord layer 40 may be omitted.

An additional bias cord layer may also be provided on the outer circumferential face side of the bias cord layer 40.

The 0° cord layer 10 may also be provided not on the inner circumferential face side of the rubber crawler 80, but on the outer circumferential face side thereof.

Further, in the first exemplary embodiment, when looking at the rubber crawler 80 from the inner circumferential face thereof, although all cords included in adjacent cord layers satisfy Equation (1-1), only the cords included in at least one pair of mutually adjacent cord layers need satisfy Equation (1-1).

Namely, configuration may be such that at least one of the following is satisfied in Equation (1-1).

$$a=1,\ a=2,\ \text{or}\ a=3$$

In such cases, the cord layers in the at least one pair of two layers for which Equation (1-1) holds are able to be suppressed from separating.

A rubber crawler with the following configuration was produced, and durability tests performed thereon to verify the advantageous effects of this example.

0° cord layer 10: $\phi_1$=0.94 mm, $D_1$=0.71 mm

Main cord layer 20: $\phi_2$=6.19 mm, $D_2$=4.47 mm

Bias cord layer 30: $\phi_3$=0.94 mm, $D_3$=1.00 mm

Bias cord layer 40: $\phi_4$=0.94 mm, $D_4$=1.00 mm

Substituting the above values into Equation (A) gives the following (values rounded to the second decimal place hereafter).

$K_1=0.57, K_2=0.58, K_3=0.48, K_4=0.48$

Accordingly, $K_1 \times K_2=0.33, (1-K_1) \times (1-K_2)=0.18,$ $K_2 \times K_3=0.28, (1-K_2) \times (1-K_3)=0.22,$ $K_3 \times K_4=0.23, (1-K_3) \times (1-K_4)=0.27,$ and Equation (1-1) hold only for a=3.

Note that the value of $[(1-K_3) \times (1-K_4)]$ is approximately 117% of the value of $(K_3 \times K_4)$.

Upon verification, the cord layers of both the 0° cord layer 10 and the main cord layer 20, and the main cord layer 20 and the bias cord layer 30, for which Equation (1-1) did not hold, were found to have separated from each other. Note that separation arose at more locations between the 0° cord layer 10 and the main cord layer 20, for which the value of $(K_a \times K_{a+1})$ on the left-hand side of Equation (1-1) less the value of $(1-K_a) \times (1-K_{a+1})$ on the right-hand side of Equation (1-1) was larger.

Separation did not occur between cord layers of the bias cord layer 40 and the bias cord layer 30, for which Equation (1-1) did hold. Namely, between the two adjacent cord layers for which the value of the right-hand side of Equation (1-1) was at least 117% of the value of the left-hand side of Equation (1-1), a cord-layer-separation-suppression effect was confirmed.

In a further embodiment, configuration may be such that the main cord 21 included in the main cord layer 20 and the cords (0° cords 11, bias cords 31) included in the cord layers adjacent to the main cord layer 20 satisfy Equation (1-1).

Namely, configuration may be such that the following is satisfied in Equation (1-1).

$(1 \le a \le 2)$

The main cord layer 20 can be suppressed from separating from the cord layers adjacent to the main cord layer 20 (namely, the 0° cord layer 10 and the bias cord layer 30) in such cases.

Moreover, by making the pitch of the cords embedded in the cord layers adjacent to the main cord layer 20 (namely, the 0° cord layer 10 and the bias cord layer 30) be more than two times the diameter of the cords, the area of portions where the cord layers adjacent to the main cord layer 20 are coupled to the main cord layer 20 by an elastic body may be made greater than the area of portions where the cords in the two cord layers overlap with each other.

The pitch of the main cord 21 is able to be reduced in such cases, enabling separation of the main cord layer 20 and the cord layers adjacent to the main cord layer 20 (namely, the 0° cord layer 10 and the bias cord layer 30) to be suppressed without taking away from the strength of the rubber crawler body 82 with respect to tension acting along the crawler circumferential direction.

Further, in the second exemplary embodiment, looking at the rubber crawler 81 from the inner circumferential face thereof, in all regions along the crawler circumferential direction, across the crawler width direction, although the area of portions where the first layer 10, the second layer 20, the third layer 30, and the fourth layer 40 are continuously coupled together by an elastic body that runs therethrough is greater than the area of portions where the respective cords in any two adjacent cord layers overlap with each other, the area of portions where the first layer 10, the second layer 20, the third layer 30, and the fourth layer 40 are continuously coupled together by an elastic body that runs therethrough may be greater than the area of portions where the respective cords in at least one pair of mutually adjacent cord layers overlap with each other.

Namely, it is sufficient that at least one of the following be satisfied.

$S_{12}<T_0, S_{23}<T_0,$ or $S_{34}<T_0$

Alternatively, the area of portions where the first layer 10, the second layer 20, the third layer 30, and the fourth layer 40 are continuously coupled together by an elastic body that runs therethrough may be configured so as to be greater than the area of portions where respective cords of the main cord layer and the cord layers adjacent to the main cord layer overlap with each other.

Namely, it is sufficient that the following be satisfied.

$S_{12}<T_0$ and $S_{23}<T_0$

Moreover, the pitch of the cords embedded in the cord layers (namely, the 0° cord layer 10 and the bias cord layer 30) adjacent to the main cord layer 20 may be made more than two times the diameter of the cords.

In these cases, the advantageous effect of enabling separation of embedded cord layers to be suppressed is heightened even further.

Note that in order to verify the effect of setting $S_{12}<T_0$, $S_{23}<T_0$, or $S_{34}<T_0$, the value of (T/S) and the presence/absence of layer separation were verified in an elastic crawler in which localized layer separation had occurred.

Upon verification, layer separation was found to have occurred between cord layers for which (T/S)=0.55, 0.77, 0.80 (namely, T<S), and layer separation was found not to have occurred between cord layers for which (T/S)=1.13 (namely, S<T). Namely, layer separation did not occur between cord layers for which S was smaller than T, and thus it was ascertained that layer separation is suppressed by setting $S_{12}<T_0, S_{23}<T_0$, or $S_{34}<T_0$.

Further, although the pitch of the cords in each of the cord layers is an equal spacing in either the crawler circumferential direction or the width direction, there is no limitation thereto.

For example, outside of the central portion of the rubber crawler 80, 81, the pitch of the cords in width direction outside portions of the rubber crawler 80, 81 may be increased such that Equation (1-1) holds in portions at the width direction outsides of the projections 50. In such cases, separation of embedded cord layers can be suppressed in portions over which the rollers 90 pass.

Figure 7:
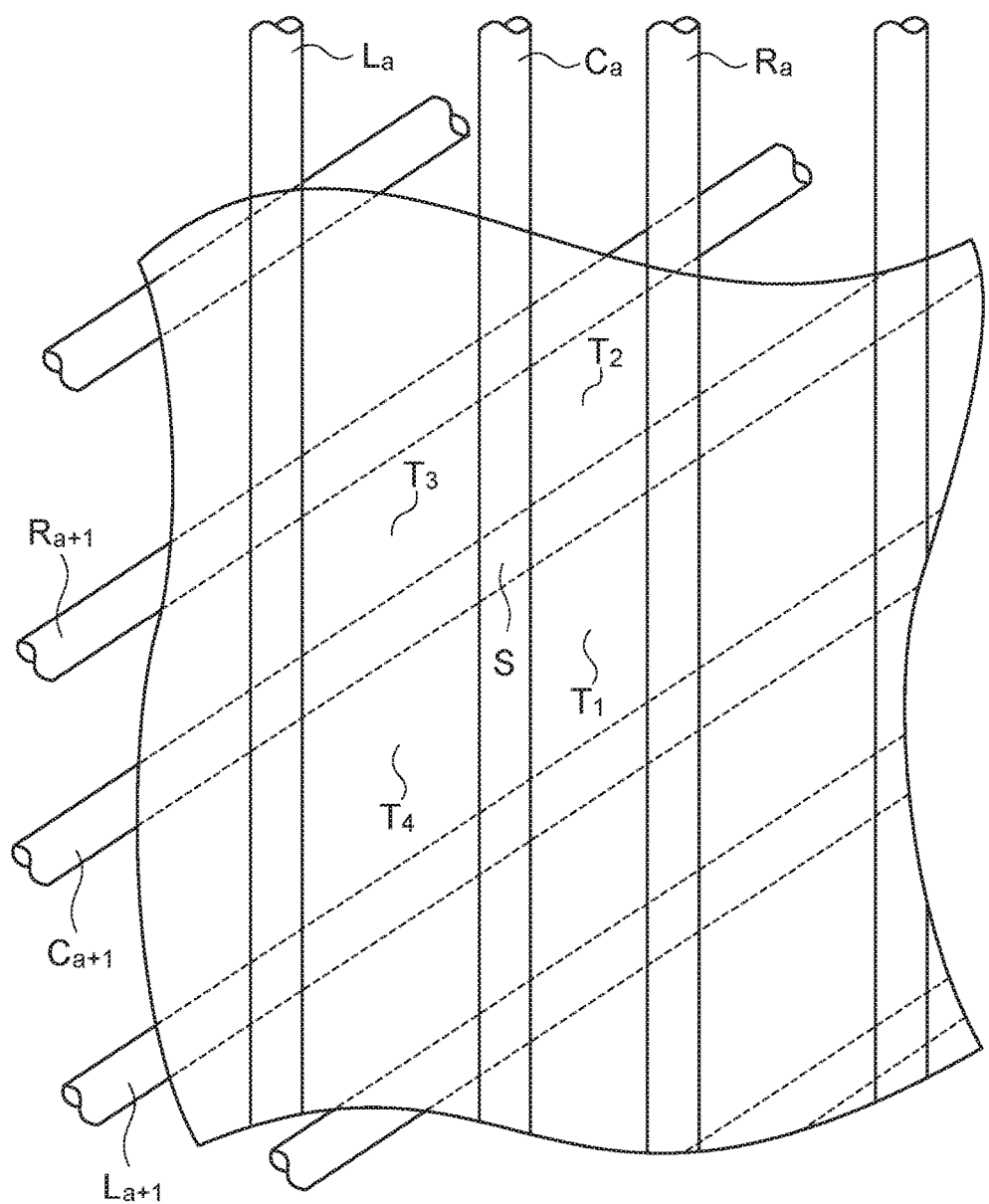
FIG. 7 is an enlarged plan view of a portion of an elastic crawler according to another exemplary embodiment of the present invention.

For example, as illustrated in FIG. 7, a cord included in layer a is denoted as $C_a$, cords that are adjacent to this cord on one side and another side thereof are respectively denoted as $L_a$ and $R_a$, a cord included in layer (a+1) is denoted as $C_{a+1}$, and cords that are adjacent to this cord on one side and another side thereof are respectively denoted as $L_{a+1}$ and $R_{a+1}$.

Here, the inter-cord distance between $C_a$ and $L_a$ differs from the inter-cord distance between $C_a$ and $R_a$. The inter-cord distance between $C_{a+1}$ and $L_{a+1}$ also differs from the inter-cord distance between $C_{a+1}$ and $R_{a+1}$.

looking at the rubber crawler 80 from the inner circumferential face thereof, in the region encompassed by $L_a$ and $R_a$, and by $L_{a+1}$ and $R_{a+1}$, when the area of portions where $C_a$ and $C_{a+1}$ overlap is taken as S and the areas where regions in which neither $C_a$ nor $C_{a+1}$ are disposed overlap with each other are taken as $T_1$, $T_2$, $T_3$, and $T_4$, in any region of the crawler, $S<T_1$, $S<T_2$, $S<T_3$, and $S<T_4$ should hold.

Further, although rubber is employed as an example of an elastic body, an elastomer or the like may also be employed.

The disclosure of Japanese Patent Application No. 2015-114704, filed on Jun. 5, 2015, is incorporated in its entirety by reference herein. All cited documents, patent applications, and technical standards mentioned in the present specification are incorporated by reference in the present specification to the same extent as if each cited document, patent application, or technical standard was specifically and individually indicated to be incorporated by reference.

The invention claimed is:

1. An elastic crawler comprising:
an elastic crawler body formed by an elastic body shaped into an endless loop;
a main cord layer including a main cord that is wound around a crawler circumferential direction of the elastic crawler body and that is covered by the elastic body; and
an intersecting cord layer adjacent to the main cord layer, including an intersecting cord that intersects with the main cord when viewed along a thickness direction of the elastic crawler body, and that is covered by the elastic body, wherein
in the main cord layer and the intersecting cord layer inside at least a partial region of the elastic crawler body, a total area of portions where the main cord and the intersecting cord overlap with each other, when viewed along the thickness direction, is smaller than a total area of portions where neither the main cord nor the intersecting cord overlap with each other when viewed along the thickness direction.

2. The elastic crawler of claim 1, wherein:
an inner circumferential face of the elastic crawler body is provided with projections spaced apart in a crawler circumferential direction; and
the partial region is a region to a crawler width direction outer side of the projections.

3. An elastic crawler comprising:
an elastic crawler body formed by an elastic body shaped into an endless loop; and
a plurality of cord layers that are formed by a plurality of cords arrayed spaced apart and covered by the elastic body, the plurality of cord layers being embedded in the elastic crawler body,
respective cords included in mutually adjacent cord layers being disposed so as to intersect each other when viewed along a thickness direction of the elastic crawler body, and
respective cords included in each layer of at least one pair of adjacent cord layers inside at least a partial region of the elastic crawler body satisfying Equation (1) below:

$$K_a \times K_{a+1} < (1-K_a) \times (1-K_{a+1}) \tag{1}$$

wherein in Equation (1),
$K_a$ expresses a ratio ($\phi_a/(\phi_a+D_a)$) between a diameter ($\phi_a$) of one cord selected from a plurality of cords included in an $a^{th}$ layer from an inner circumferential face side of the elastic crawler body and a pitch of the one cord ($\phi_a+D_a$ ($D_a$ expresses an inter-cord distance between the one cord and another cord adjacent to the one cord in the layer a)),
$1-K_a$ expresses a ratio ($D_a/(\phi+D_a)$) between the inter-cord distance ($D_a$) and the pitch of the one cord ($\phi_a+D_a$), $K_{a+1}$ expresses a ratio ($\phi_{a+1}/(\phi_{a+1}+D_{a+1})$) between a diameter ($\phi_{a+1}$) of one cord selected from a plurality of cords included in an $(a+1)^{th}$ layer from the inner circumferential face side of the elastic crawler body and a pitch of the one cord ($\phi_{a+1}+D_{a+1}$ ($D_{a+1}$ expresses an inter-cord distance between the one cord and another cord adjacent to the one cord in layer (a+1))),
$1-K_{a+1}$ expresses a ratio ($D_{a+1}/(\phi_{a+1}+D_{a+1})$) between the inter-cord distance ($D_{a+1}$) and the pitch of the one cord ($\phi_{a+1}+D_{a+1}$), and
$1 \leq a \leq X-1$, with $X \geq 2$ and X expressing a number of the cord layers.

4. The elastic crawler of claim 3, wherein:
the plurality of cord layers include a main cord layer and an intersecting cord layer adjacent to the main cord layer,
the main cord layer including a main cord that is wound around a crawler circumferential direction of the elastic crawler body and that is covered by the elastic body,
the intersecting cord layer including an intersecting cord that intersects with the main cord when viewed along the thickness direction of the elastic crawler body, and that is covered by the elastic body, and
the main cord included in the main cord layer and the intersecting cord included in the intersecting cord layer satisfying Equation (1).

5. The elastic crawler of claim 3, wherein:
the plurality of cord layers include a main cord layer and an intersecting cord layer adjacent to the main cord layer,
the main cord layer including a main cord that is wound around a crawler circumferential direction of the elastic crawler body and that is covered by the elastic body,
the intersecting cord layer including an intersecting cord that intersects with the main cord when viewed along the thickness direction of the elastic crawler body, and that is covered by the elastic body, and
the main cord included in the main cord layer and the intersecting cord included in the intersecting cord layer satisfying Equation (1); and
a pitch of the intersecting cord is more than two times a diameter of the intersecting cord.

6. The elastic crawler of claim 3, wherein respective cords included in all mutually adjacent cord layers satisfy Equation (1).

7. The elastic crawler of claim 3, wherein:
when viewed along the thickness direction of the elastic crawler body, the elastic crawler includes a portion in which the elastic body runs through all of the cord layers so as to couple the cord layers together.

8. The elastic crawler of claim 3, wherein:
each of the cords satisfying Equation (1) also satisfies the following Equation (2) when viewed along the thickness direction of the elastic crawler body:

$$K_a \times K_{a+1} < (1-K_1) \times (1-K_2) \times \ldots \times (1-K_x) \tag{2}$$

9. The elastic crawler of claim 3, wherein:
an inner circumferential face of the elastic crawler body is provided with projections spaced apart in a crawler circumferential direction; and
the partial region is a region to a crawler width direction outer side of the projections.

10. The elastic crawler of claim 3, wherein:
the plurality of cord layers include a main cord layer and an intersecting cord layer adjacent to the main cord layer,
  the main cord layer including a main cord that is wound around a crawler circumferential direction of the elastic crawler body and that is covered by the elastic body,
  the intersecting cord layer including an intersecting cord that intersects with the main cord when viewed along the thickness direction of the elastic crawler body, and that is covered by the elastic body, and
  the main cord included in the main cord layer and the intersecting cord included in the intersecting cord layer satisfying Equation (1); and
when viewed along the thickness direction of the elastic crawler body, the elastic crawler includes a portion in which the elastic body runs through all of the cord layers so as to couple the cord layers together.

11. The elastic crawler of claim 3, wherein:
the plurality of cord layers include a main cord layer and an intersecting cord layer adjacent to the main cord layer,
  the main cord layer including a main cord that is wound around a crawler circumferential direction of the elastic crawler body and that is covered by the elastic body, and
  the intersecting cord layer including an intersecting cord that intersects with the main cord when viewed along the thickness direction of the elastic crawler body, and that is covered by the elastic body; and
each of the cords satisfying Equation (1) also satisfies the following Equation (2) when viewed along the thickness direction of the elastic crawler body:

$$K_a \times K_{a+1} < (1-K_1) \times (1-K_2) \times \ldots \times (1-K_x) \qquad (2).$$

12. The elastic crawler of claim 3, wherein:
the plurality of cord layers include a main cord layer and an intersecting cord layer adjacent to the main cord layer,
  the main cord layer including a main cord that is wound around a crawler circumferential direction of the elastic crawler body and that is covered by the elastic body,
  the intersecting cord layer including an intersecting cord that intersects with the main cord when viewed along the thickness direction of the elastic crawler body, and that is covered by the elastic body;
an inner circumferential face of the elastic crawler body is provided with projections spaced apart in a crawler circumferential direction; and
the partial region is a region to a crawler width direction outer side of the projections.

13. The elastic crawler of claim 3, wherein:
respective cords included in all mutually adjacent cord layers satisfy Equation (1), and
when viewed along the thickness direction of the elastic crawler body, the elastic crawler includes a portion in which the elastic body runs through all of the cord layers so as to couple the cord layers together.

14. The elastic crawler of claim 3, wherein:
respective cords included in all mutually adjacent cord layers satisfy Equation (1), and
each of the cords satisfying Equation (1) also satisfies the following Equation (2) when viewed along the thickness direction of the elastic crawler body:

$$K_a \times K_{a+1} < (1-K_1) \times (1-K_2) \times \ldots \times (1-K_x) \qquad (2).$$

15. The elastic crawler of claim 3, wherein:
respective cords included in all mutually adjacent cord layers satisfy Equation (1);
an inner circumferential face of the elastic crawler body is provided with projections spaced apart in a crawler circumferential direction; and
the partial region is a region to a crawler width direction outer side of the projections.

16. The elastic crawler of claim 3, wherein:
when viewed along the thickness direction of the elastic crawler body, the elastic crawler includes a portion in which the elastic body runs through all of the cord layers so as to couple the cord layers together, and
each of the cords satisfying Equation (1) also satisfies the following Equation (2) when viewed along the thickness direction of the elastic crawler body:

$$K_a \times K_{a+1} < (1-K_1) \times (1-K_2) \times \ldots \times (1-K_x) \qquad (2).$$

17. The elastic crawler of claim 3, wherein:
when viewed along the thickness direction of the elastic crawler body, the elastic crawler includes a portion in which the elastic body runs through all of the cord layers so as to couple the cord layers together, and
an inner circumferential face of the elastic crawler body is provided with projections spaced apart in a crawler circumferential direction; and
the partial region is a region to a crawler width direction outer side of the projections.

18. The elastic crawler of claim 3, wherein:
an inner circumferential face of the elastic crawler body is provided with projections spaced apart in a crawler circumferential direction;
the partial region is a region to a crawler width direction outer side of the projections; and
each of the cords satisfying Equation (1) also satisfies the following Equation (2) when viewed along the thickness direction of the elastic crawler body:

$$K_a \times K_{a+1} < (1-K_1) \times (1-K_2) \times \ldots \times (1-K_x) \qquad (2).$$

19. The elastic crawler of claim 3, wherein:
the plurality of cord layers include a main cord layer and an intersecting cord layer adjacent to the main cord layer,
  the main cord layer including a main cord that is wound around a crawler circumferential direction of the elastic crawler body and that is covered by the elastic body,
  the intersecting cord layer including an intersecting cord that intersects with the main cord when viewed along the thickness direction of the elastic crawler body, and that is covered by the elastic body, and
  the main cord included in the main cord layer and the intersecting cord included in the intersecting cord layer satisfying Equation (1);
a pitch of the intersecting cord is more than two times a diameter of the intersecting cord; and
when viewed along the thickness direction of the elastic crawler body, the elastic crawler includes a portion in which the elastic body runs through all of the cord layers so as to couple the cord layers together.

20. The elastic crawler of claim 3, wherein:
the plurality of cord layers include a main cord layer and an intersecting cord layer adjacent to the main cord layer, the main cord layer including a main cord that is wound around a crawler circumferential direction of the elastic crawler body and that is covered by the elastic body, the intersecting cord layer including an intersecting cord that intersects with the main cord when viewed along the thickness direction of the elastic crawler body, and that is covered by the elastic body, and the main cord included in the main cord layer and the intersecting cord included in the intersecting cord layer satisfying Equation (1);

a pitch of the intersecting cord is more than two times a diameter of the intersecting cord; and each of the cords satisfying Equation (1) also satisfies the following Equation (2) when viewed along the thickness direction of the elastic crawler body:

$$K_a \times K_{a+1} < (1-K_1) \times (1-K_2) \times \ldots \times (1-K_x) \qquad (2).$$

* * * * *